Sept. 1, 1959 SHUICHI AMANO 2,901,954
EXPOSURE TIME ADJUSTMENT IN CAMERA SHUTTERS
Filed May 9, 1955 3 Sheets-Sheet 3

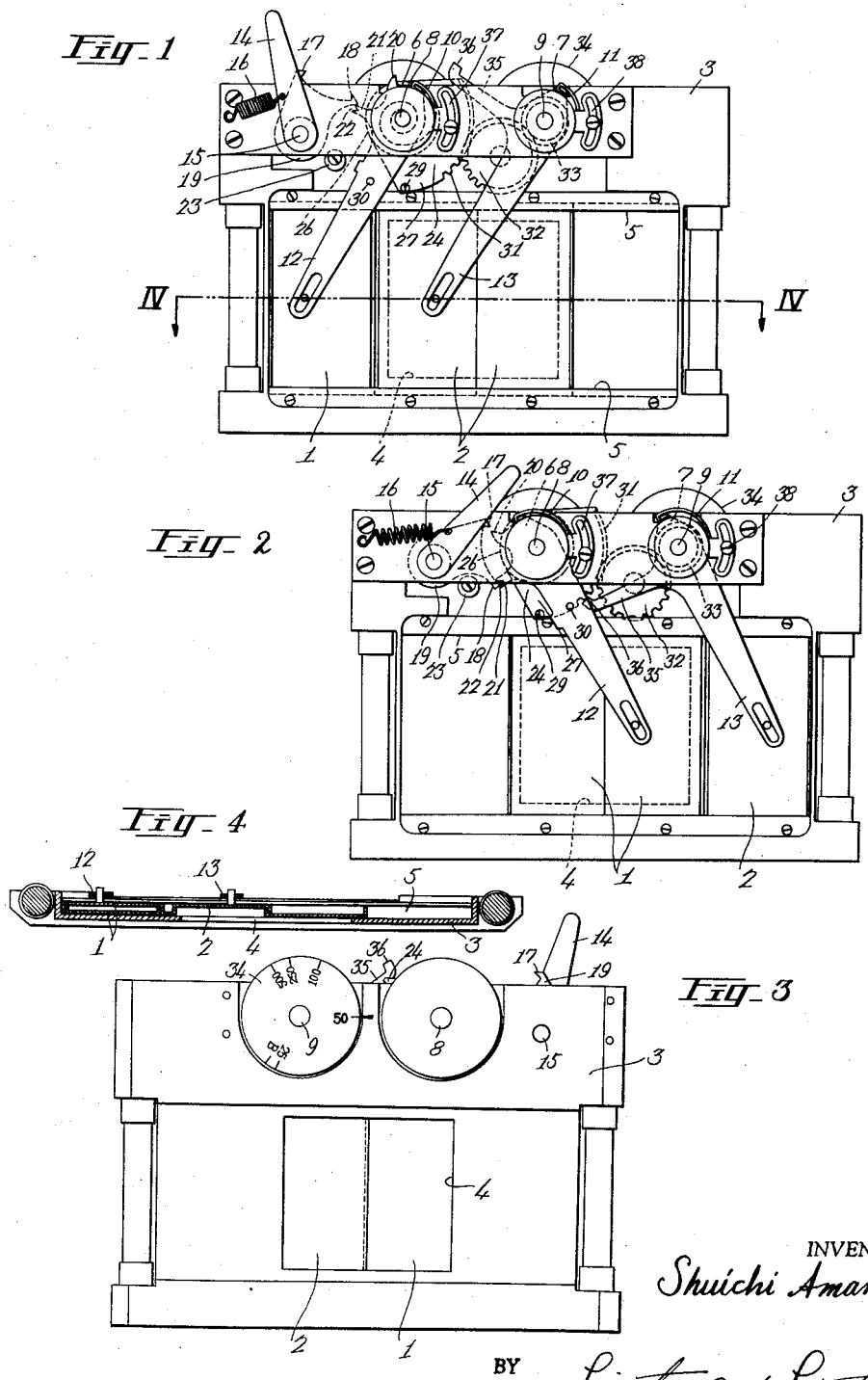

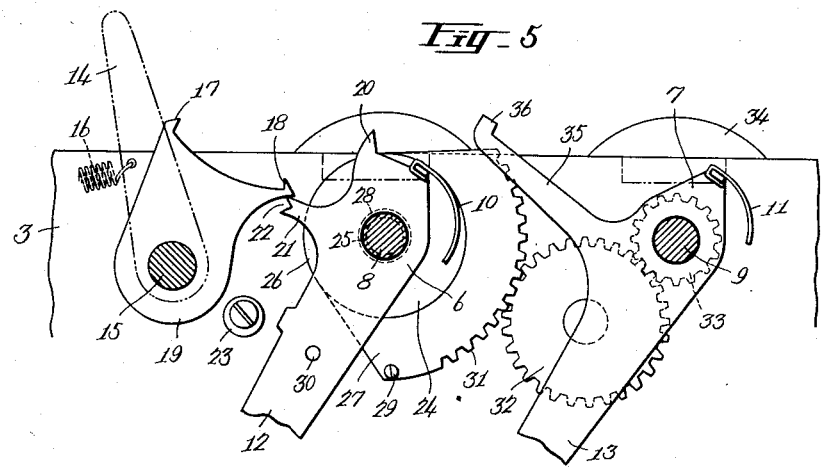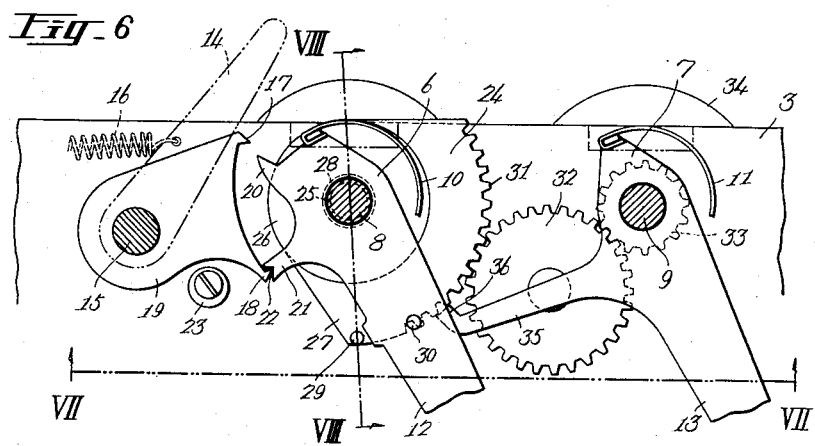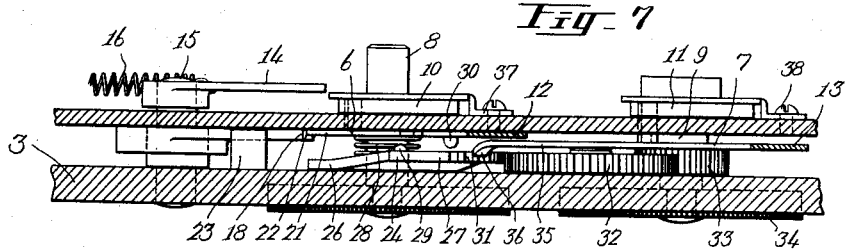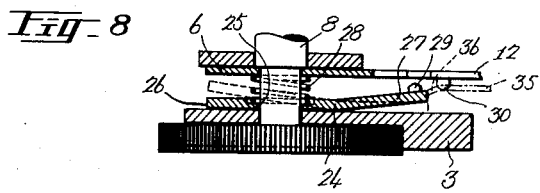

INVENTOR
Shuichi Amano
BY Linton and Linton
ATTORNEYS

United States Patent Office 2,901,954
Patented Sept. 1, 1959

2,901,954
EXPOSURE TIME ADJUSTMENT IN CAMERA SHUTTERS

Shuichi Amano, Kohoku-ku, Yokohama, Japan

Application May 9, 1955, Serial No. 507,089

5 Claims. (Cl. 95—55)

This invention relates to a shutter for photographic cameras, and more particularly to an apparatus for adjustment of time of exposure in shutters for cameras. A known type of apparatus for adjustment of time of exposure which has been adapted to a shutter of a well-known focal plane type has the defect that the dial-plate for adjustment of time of exposure is obliged to turn at the instant when the shutter is released or is set, and such a turning motion of a dial-plate has caused various inconveniences in the operation of cameras.

It is an important object of the present invention to provide an apparatus which is free from the foregoing defect or inconvenience and which is especially simple in construction and simple in operation.

According to the present invention, a restraining plate is provided between a turning body for operating the front blind of a shutter and a turning body for operating the rear blind in such a manner that the plate may not only be turned round from side to side by means of a dial-plate but also be pushed in a direction substantially vertical to its surface. And, the apparatus of the present invention may be adapted not only to a shutter of the kind comprising a pair of rigid sliding-blinds but also a shutter of the kind comprising a pair of flexible roller-blinds.

In order that the present invention may be clearly understood and readily carried into effect the same will now be described with reference to and by the aid of the accompanying drawings, in which:

Fig. 1 to Fig. 8 inclusive illustrate one example of the construction of the apparatus of the invention in the state where the apparatus is combined with a shutter of the type comprising a pair of rigid sliding-blinds, and Fig. 1 is a front view with the shutter not yet set;

Fig. 2 is a front view of the same with the shutter already set;

Fig. 3 is a rear side view;

Fig. 4 is a section taken along the line IV—IV of Fig. 1;

Fig. 5 is an enlarged front view of the shutter control where the shutter is already released;

Fig. 6 is similar to Fig. 5, but with the shutter set;

Fig. 7 is a section taken along the line VII—VII of Fig. 6;

Fig. 8 is a section taken along the line VIII—VIII of Fig. 6.

Fig. 9 is a section of the shutter controls of a modified form;

Fig. 10 is a section taken along the line X—X of Fig. 9.

Figure 9:
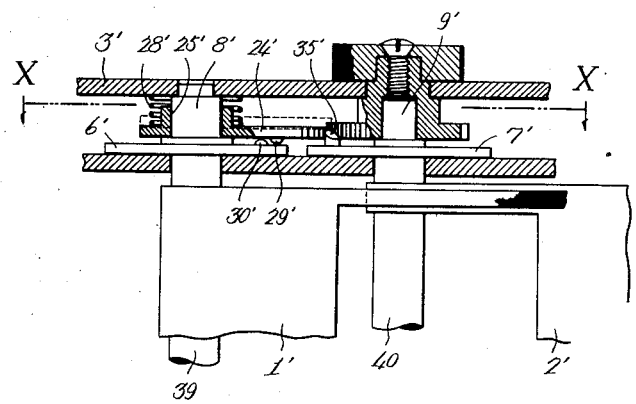
Figs. 9 and 10 illustrate another example of the construction of the apparatus of the invention which is combined with a shutter of the kind comprising a pair of flexible roller-blinds.

To begin with, the apparatus of the invention will be explained with reference to the modification where the apparatus is combined with a shutter of the type comprising a pair of sliding-blinds. Referring to the drawings, 1 and 2 show, respectively, the front blind and the rear blind of a shutter, and these blinds are made of metal plate. These blinds 1 and 2 may slide from side to side along the guide-rail 5 over the exposure aperture 4 which is made in the middle part of the main plate 3. 6 and 7 show, respectively, a turning body for operating the front blind 1 and a turning body for operating the rear blind 2, and these turning bodies 6, 7 are arranged in such a manner that they may turn, respectively, on the axes 8 and 9 that are rotatably mounted in the plate 3. These bodies are turned clockwise, respectively, by the spring 10 and by the spring 11, and are connected with both blinds 1 and 2 by the connecting arms 12 and 13, respectively, so that the blinds 1 and 2 may be moved from side to side by turning these bodies 6 and 7.

Referring to the drawings, 14 shows an operating lever which is fastened on the axis 15 mounted rotatably in the main plate 3, and this lever is pulled by the spring 16 towards one direction. The claw-plate 19 with projecting claws 17 and 18 is fixed on the axis 15 and, correspondingly, two claws 20 and 21 external from the turning body 6 as one body. The V-shaped groove 22 is provided at the top end of the claw 21. 23 shows a stopper for the lever 14.

In the drawings, 24 shows a restraining plate, which is shaped in the form of a segment having the teeth 31. The hole 25 is made in this plate 24, and the axis 8 is loosely fitted in this hole 25 so that this plate 24 may not only be turned about the axis 8 but also be inclined slightly in a direction substantially vertical to its surface. Furthermore, this plate 24 is formed in such a manner that the rear surface of the basic part 26 and the rear surface of the main part 27 thereof are mutually inclined slightly, as is clearly shown in Fig. 8, and this plate is pushed by the spring 28, so that in its usual state the rear surface of the basic part 26 of the plate 24 is pressed against the front surface of the main plate 3 and the rear surface of the main part 27 of the plate is spaced slightly from said surface. And, if the plate 24, or the main part 27 of the plate, is pushed in a direction substantially vertical to its surface, this plate 24, or the main part of the plate, is inclined nearer to the surface of the main plate 3, as is shown by dotted lines in Fig. 8. The projection 29 is provided on the front surface of the restraining plate 24 and the projection 30 is correspondingly provided on the rear surface of the connecting arm 12 of the turning body 6, so that, when the turning body 6 for operating the front blind 1 has been turned by a certain angle about the axis 8 and consequently the projection 30 provided on the surface of the arm 12 has been moved to the position of the projection 29 provided on the surface of the restraining plate 24, the projection 30 pushes the projection 29 in a direction substantially vertical to the surface of the plate 24 and, consequently, the plate 24, or the main part 27 of the plate, is pushed nearer to the surface of the main plate 3. The teeth 31 of the plate 24 are engaged with the idle gear 32 with which the gear 33, which is mounted rotatably on the axis 9 and is provided with the dial-plate 34, is engaged so that the restraining plate 24 may be turned by turning the dial-plate 34 for the purpose of changing the position of the projection 29 on it at will. A shutter scale is marked on the surface of the dial-plate 34, as shown clearly in Fig. 3.

The engaging arm 35 is projected from the turning body 7 for operating the rear blind 2 as one body, and the claw 36 is provided at the top end of the arm 35. The said arm 35 engages with the teeth 31 of the restraining plate 24 to restrain the turning movement of the turning body 7 and to stop the body in its set-position, when the said turning body 7 has been turned to its set-position as shown in Figs. 2 and 6. The engagement between the engaging arm 35 of the turning body 7 and the teeth 31 of the restraining plate 24 may be released when the restraining plate 24 is pushed away by the turning body 6 in such a manner as was described above. If the said engagement is released, the turning body 7 which exists under the influence of the spring 11 is started to turn and the rear blind 2 is driven to the left at the same time.

Now, the operation of the apparatus will be explained. In the state as is shown in Figs. 1 and 5, if the operating lever 14 is pushed to the right, the claw-plate 19 is turned clockwise together with the lever 14 and the claw 18 of claw-plate 19 pushes the upper edge of the claw 21 to turn the turning body 6 counter-clockwise against the force of the spring 10, so the front blind 1 is driven to the right by this body 6 and at the same time the rear blind 2 is pushed in the same direction by the front blind 1 to turn counter-clockwise the other turning body 7. If the lever 14 is left free after it has been pushed slightly more to the right to the position where the motion of the lever is prevented by the engagement between the claw 17 and the claw 20, the said lever is pulled back slightly by the spring 16 to the position where the claw 18 engages into the groove 22 of the claw 21, and both the lever 14 and the turning body 6 are kept in this position. At the same time, the other turning body 7 of which the counter-clockwise turning motion follows the counter-clockwise turning motion of the turning body 6 as mentioned before, is turned to its set-position and is stopped in this position by engaging its arm 35 with the teeth 31 of the restraining plate 24. Thus, the shutter is set and this state is shown in Figs. 2 and 6.

Then, if the operating lever 14 is pushed again to the right slightly, the engagement between the claw 18 and the groove 22 may be released, and the turning body 6 is caused to turn clockwise by the force of the spring 10, so the front blind 1 is started to move to the left to open the exposure aperture 4. When said turning body 6 has been turned by a certain angle to the position where the projection 30 of the arm 12 of the body 6 touches the projection 29 of the restraining plate 24, the plate 24 is pushed away to release the engagement between the teeth 31 of the plate and the engaging arm 35 of the turning body 7, and the turning body 7 is caused to turn clockwise by the force of the spring 11. And, consequently, the rear blind 2 follows after the front blind 1 to close the exposure aperture 4. Thus, the shutter is completely released and every part of the shutter returns to the original state as is shown in Figs. 1 and 5.

It is clear from the foregoing explanations that any desired time of exposure may be obtained at will if the position of the projection 29 is properly adjusted prior to the release of the shutter by turning the restraining plate 24 by means of the dial-plate 34. And, such an adjustment may be performed not only in the case where the shutter is not yet set but also in the case where the shutter is already set, since the restraining plate 24 may be turned at any time. Furthermore, any intermediate time of exposure not marked particularly may be obtained in this case, since the restraining plate 24 may be stopped in any position.

The better adjustment of time of exposure may be performed by changing the strength of force of the springs 10 and 11 corresponding to the time of exposure, and by this means the range of adjustment of the time of exposure may be extended. In the drawings, 37 and 38 show the parts with which the forces of the springs 10 and 11 may be adjusted at will.

Figure 10:
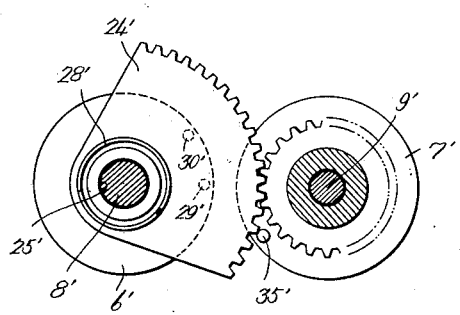

It is possible to apply the apparatus of the present invention to a shutter of the kind comprising a pair of flexible roller-blinds, and one example of it is illustrated in Figs. 9 and 10. Referring to these drawings, the turning body 6' for operating the front blind 1' is fixed on the axis 8' to which the roller 39 for winding the front blind is attached, and the turning body 7' for operating the rear blind 2' is fixed on the axis 9' to which the roller 40 for winding the rear blind 2' is attached. The connecting arms 12 and 13, that connect the blinds 1 and 2 with the turning bodies 6 and 7, are not required in this case, and the projection 30' is provided not on the surface of the connecting arm 12 but on the surface of the turning body 6' itself. Instead of the engaging arm 35 which is projected from the turning body 7, the engaging pin 35' is provided on the surface of the turning body 7'.

The restraining plate 24' of another type is adopted in this case. The restraining plate 24', of which the surface is evenly formed, is slidably mounted on the axis 8' and is pushed in a direction substantially vertical to its surface by the spring 28'. This plate 24' may slide along the axis 8' against the force of the spring 28' as is shown by dotted lines in Fig. 9 if it is pushed away by the turning body 6' in a direction substantially vertical to its surface. The restraining plate 24' of this type is not different from that of the type mentioned before in effect or in operation, and the plate of this type may be adapted to a shutter of the kind comprising a pair of rigid sliding-blinds.

Having thus described my invention, what I claim is:

1. A shutter control for a pair of shutter blinds comprising a front blind, a rear blind positioned for being contacted by and moved by said front blind to their set position, a pair of rotatable members having their respective axes parallel with each other, each of said rotatable members being connected to one of said blinds for operating the same, springs each tending to turn one of said members with its blind to their released positions, means for moving and restraining the rotatable member for said front blind in its set position and releasing said rotatable members, a restraining plate mounted loosely on an axis parallel with said axis of the rotatable member for said front blind in such a manner that it may rotate about said axis and also may move in a direction in line with said axis, resilient means tending to retain said plate against movement in line with said axis, said restraining plate being in the form of a segmental gear having teeth along the outer edge thereof, a projection mounted on the surface of said restraining plate, another projection mounted on the corresponding surface of said rotatable member of said front blind for engaging with said first mentioned projection at a predetermined point in the time of movement of said rotatable member for pushing said restraining plate in line with said axis against said resilient means, an engaging arm projecting from the rotatable member for said rear blind for engaging said outer edge teeth of said restraining plate for restraining the motion of said rear blind rotatable member and also to be disengaged from said plate by the motion of said plate in line with said axis for permitting the motion of said rear blind rotatable member, a rotatable dial-plate, a gear connected to said dial-plate, and an idle gear meshed with the teeth of said restraining plate and said gear, whereby said plate may be rotated for adjusting the position of the projection thereof.

2. A shutter control for a pair of shutter blinds comprising a pair of pivotally mounted members having substantially parallel axes and each connected to one of said blinds for operating the same, resilient means tending to pivot said members in one direction, a plate having teeth along one edge thereof mounted for pivoting and for lateral movement on an axis substantially parallel to said member axis, means for manually pivoting one of said members in an opposite direction to said resilient means moving said blinds to their set position, tending to retain and release said member in that order, a gear train meshing with said plate teeth, manual means for operating said gear train varying the position of said plate, a projection carried by said plate, a projection carried by said one of said members and positioned for engaging said first projection laterally moving said plate and retaining means carried by the other of said members for engaging the teeth of said plate, thus retaining said other member and plate from movement until said plate is laterally moved disengaging said retaining means from said other plate for permitting said resilient means to pivot said members and move said blinds.

3. A shutter control for a pair of shutter blinds comprising a pair of substantially parallel axles, a pair of levers each fixedly connected to one of said axles for being pivoted therewith and connected to one of said blinds for operating the same, resilient means tending to pivot said levers in one direction, a segmental plate gear loosely mounted on one of said axles for pivoting and lateral movement thereon, manual means for pivoting one of said levers in a direction opposite to said resilient means moving said blinds therewith to their set position and tending to retain one of said levers from pivoting under the action of said resilient means, a projection carried by the other of said levers for engaging said gear and tending to retain said lever from pivoting until said manual means is operated to release said first-mentioned lever and means carried by said first mentioned lever for disengaging upon release thereof said gear from said projection, thus releasing the second of said levers whereby said levers and their blinds are released one after the other and moved by said resilient means to their initial position.

4. A shutter control for a pair of shutter blinds as claimed in claim 3, wherein said projection is of an elongated L-shaped configuration and extends from a side of the other of said levers for engaging said gear teeth tending to hold said lever against the action of said resilient means.

5. A shutter control for a pair of shutter blinds as claimed in claim 3, wherein said manual means for pivoting said levers consists of an axle, a hand lever fixedly connected to said axle, resilient means tending to restrain said lever from pivoting, a plate fixedly connected to said axle and having a pair of claws extending therefrom and said first-mentioned lever having a pair of corresponding claws with one claw having an end groove whereby pivoting of said hand lever causes one plate claw to engage one lever claw for moving and retaining said first-mentioned lever upon insertion of said plate claw in said lever claw groove, and causing disengagement upon further pivoting of said hand lever claw with the second plate claw contacting the second hand lever claw and moving said first-mentioned plate claw from engagement with said first-mentioned lever claw.

References Cited in the file of this patent

UNITED STATES PATENTS

| | | |
|---|---|---|
| 2,195,330 | Hineline | Mar. 26, 1940 |
| 2,338,628 | Fairbanks | Jan. 4, 1944 |
| 2,673,501 | Duchatellier | Mar. 30, 1954 |

FOREIGN PATENTS

| | | |
|---|---|---|
| 6,058 | Great Britain | 1900 |